United States Patent [19]

Berti et al.

[11] 4,409,687

[45] Oct. 11, 1983

[54] ARRANGEMENT AND METHOD FOR ESTABLISHING RADIO COMMUNICATION IN A SYSTEM

[75] Inventors: John C. Berti; James W. Williams, both of Lynchburg, Va.

[73] Assignee: General Electric Company, Lynchburg, Va.

[21] Appl. No.: 254,080

[22] Filed: Apr. 14, 1981

Related U.S. Application Data

[63] Continuation of Ser. No. 110,995, Jan. 10, 1980, abandoned, which is a continuation of Ser. No. 956,085, Oct. 30, 1978, abandoned.

[51] Int. Cl.$^3$ .......................... H04Q 7/02; H04B 7/26
[52] U.S. Cl. ............................................. 455/7; 455/32; 455/35; 455/54; 179/2 EB
[58] Field of Search ............... 455/7, 15, 17, 18, 31, 455/32, 34, 35, 36, 53, 54, 56, 58; 340/311.1, 825.48, 825.47, 825.52; 179/2 EB; 370/93, 95

[56] References Cited

U.S. PATENT DOCUMENTS

| | | | |
|---|---|---|---|
| 2,533,662 | 12/1950 | Bartelink | 455/32 |
| 3,173,966 | 9/1965 | Rypinski | 179/41 |
| 3,376,509 | 10/1968 | Willcox et al. | 455/58 |
| 3,387,212 | 6/1968 | Kaufman | 340/825.48 |
| 3,426,279 | 2/1969 | Berman | 455/32 |
| 3,535,636 | 10/1970 | Muilwijk | 455/32 |
| 3,555,424 | 1/1971 | Malm | 455/38 |
| 3,634,627 | 1/1972 | Velentini | 370/95 |
| 3,707,679 | 3/1972 | Bruley et al. | 455/54 |
| 3,808,537 | 11/1974 | Sarati et al. | 375/62 |
| 4,009,442 | 2/1977 | Bromssen | 455/164 |
| 4,013,958 | 5/1977 | Spayth | 455/32 |
| 4,125,808 | 11/1978 | Graham | 455/32 |
| 4,129,749 | 8/1978 | Goldman | 179/2 EB |

FOREIGN PATENT DOCUMENTS

| | | |
|---|---|---|
| 2030347 | 12/1978 | Fed. Rep. of Germany . |
| 850698 | 5/1960 | United Kingdom . |
| 1297071 | 7/1962 | United Kingdom . |
| 1145899 | 1/1969 | United Kingdom . |
| 1175130 | 9/1969 | United Kingdom . |
| 1185789 | 6/1970 | United Kingdom . |
| 1276941 | 4/1972 | United Kingdom . |

OTHER PUBLICATIONS

IMTS System Description–LBI-8758A–General Electric Co.
The Basics of Trunked Mobile Radio by Rybicki et al., Bernard Johnson, Inc.—Mobile Times—October 1980, pp. 24–27.

*Primary Examiner*—Benedict V. Safourek
*Attorney, Agent, or Firm*—Cushman, Darby & Cushman

[57] ABSTRACT

Communication between a first radio transmitter and receiver and a second radio transmitter and receiver is provided by a system repeater. An arrangement for each radio transmitter and receiver in the system establishes communication on a radio frequency channel selected from a plurality of such channels. When an arrangement is in an idle or receive mode, it causes the associated receiver to search the channels for a predetermined group tone or tones assigned to each receiver. When the predetermined group tone or tones are received on a channel, the arrangement enables the associated transmitter and receiver on that channel. When an arrangement is in a call originate or transmit mode, it causes the associated receiver to search for an idle or unused channel. When an idle channel is found, the arrangement enables the associated transmitter and receiver on that channel, and causes the transmitter to transmit a busy tone and the predetermined group tone or tones so as to enable the other transmitters and receivers of the predetermined group on that same channel.

48 Claims, 8 Drawing Figures

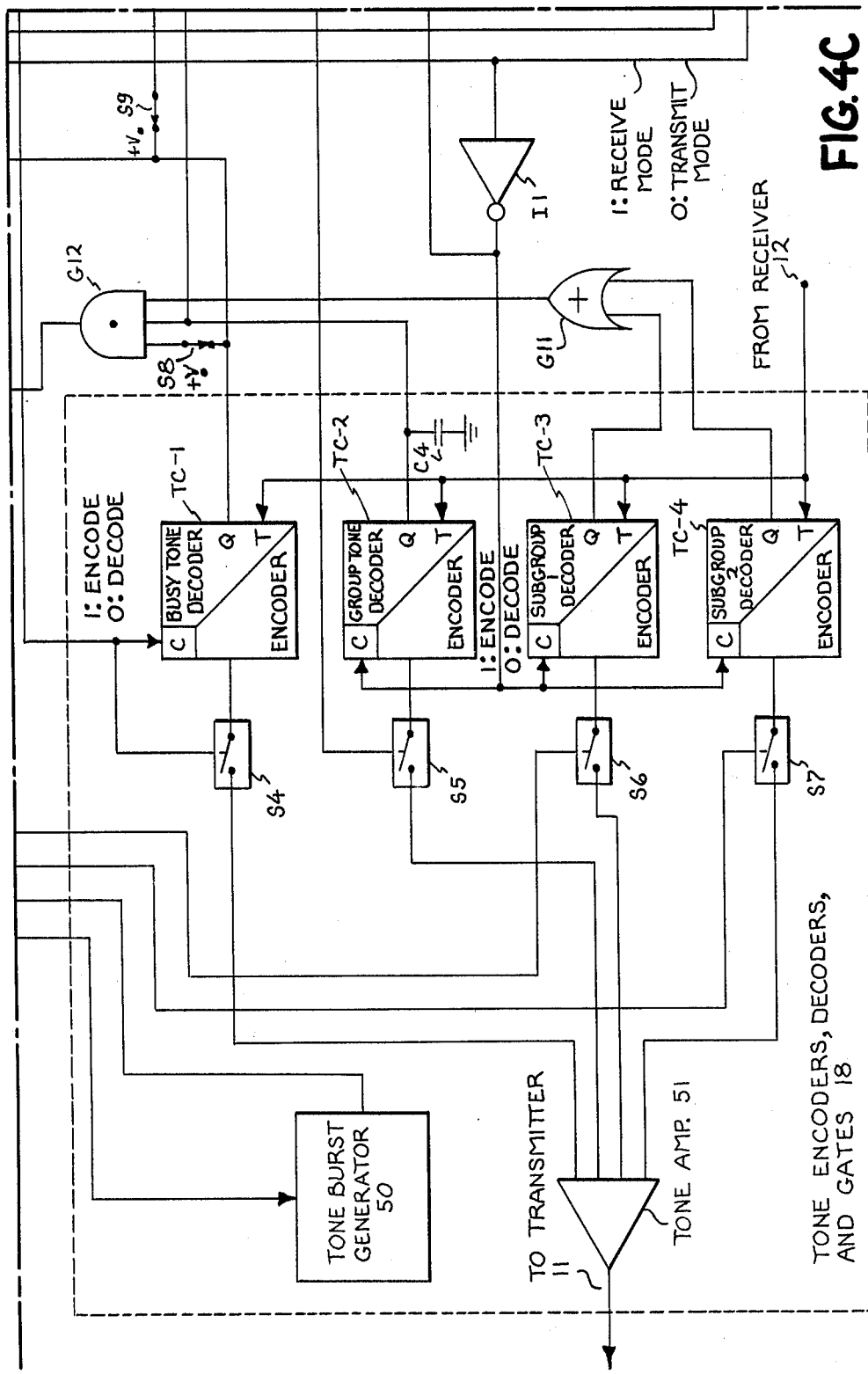

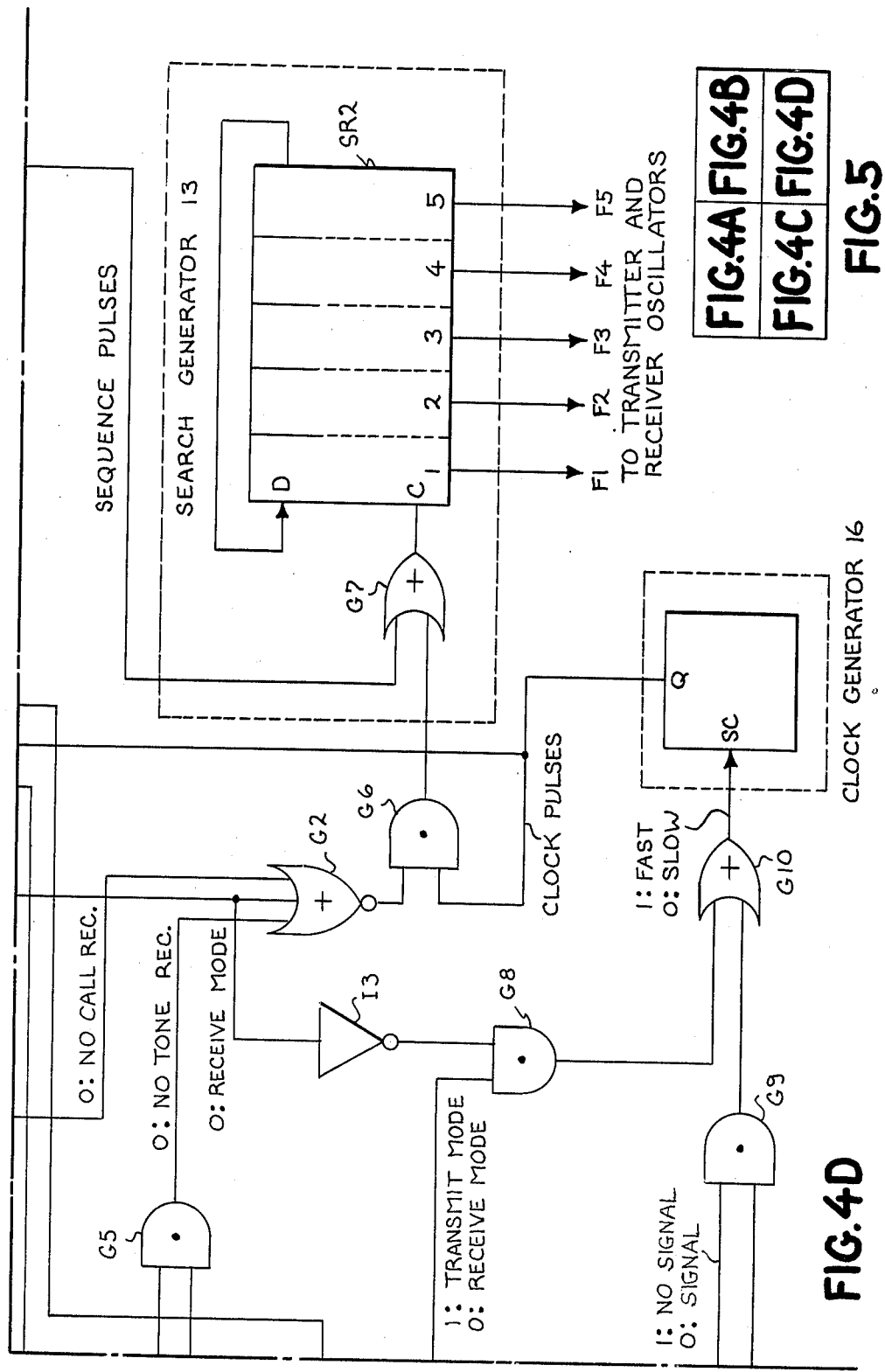

ARRANGEMENT AND METHOD FOR ESTABLISHING RADIO COMMUNICATION IN A SYSTEM

This is a continuation, of application Ser. No. 110,995 filed Jan. 10, 1980 which is, in turn, a continuation of Ser. No. 956,085 filed Oct. 30, 1978, both abandoned.

BACKGROUND OF THE INVENTION

Our invention relates to a radio communication system, and particularly to an improved arrangement and method for establishing communication through a repeater between a first transmitter and receiver and a second transmitter and receiver over a radio frequency channel selected from a plurality of such channels.

In many localities, a plurality of land mobile radio frequency channels are allocated for communication between vehicles. Generally, there may be, and usually are, many more vehicles with radio transmitters and receivers than there are available radio frequency channels in a given locality. Consequently, some arrangement is needed for enabling a mobile vehicle user to obtain a radio frequency channel. As used in this application, radio frequency channel means at least a first radio frequency for transmitting and a second radio frequency for receiving.

Accordingly, a primary object of our invention is to provide a new and improved arrangement or method for detecting an idle radio frequency channel in a plurality of such channels, and enabling a transmitter and receiver on that idle channel for communication with another transmitter and receiver.

Another and fairly general object of our invention is to provide a new and improved arrangement or method for establishing radio communication between vehicles through a radio repeater.

Another object of our invention is to provide a new and improved arrangement or method for detecting an idle radio frequency channel, and enabling a transmitter and receiver on that idle channel for communication with another transmitter and receiver through an intermediate repeater.

Another object of our invention is to provide a new and improved communication establishing arrangement which can be placed in a transmit or call originate mode to enable an associated radio transmitter and receiver on an idle radio frequency channel, and to enable other transmitters and receivers in a selected or predetermined group on the same radio frequency channel.

Another object of our invention is to provide a new and improved communication establishing arrangement which can be placed in a receive or idle mode to cause an associated radio receiver to scan or search the available radio frequency channels and to enable the associated radio transmitter and receiver on the radio frequency channel having a tone indicative of a predetermined group.

Arrangements for establishing radio communication between vehicles have been provided, and are sometimes called trunking systems. However, such arrangements have been relatively complex and hence expensive, or have required a separate radio signalling channel for establishing communication between vehicles. Such a signalling channel is typically not available for voice communication, so that the utilization of the radio frequency spectrum is not as effective as might be desired.

Therefore, another object of our invention is to provide a new and improved arrangement that is relatively simple and hence inexpensive to establish radio communication between vehicles.

Another object of our invention is to provide a new and improved arrangement or method to establish radio communication between vehicles through a repeater without the need for a separate radio signalling channel.

Another object of our invention is to provide a new and improved mobile radio trunking arrangement that operates without the use of a common control terminal at or for the repeater, as required in some prior art trunking arrangements.

SUMMARY OF THE INVENTION

Briefly, these and other objects are achieved by an arrangement in accordance with our invention for each radio transmitter and receiver in a communication system. Our arrangement can be placed in a call originate or transmit mode or in an idle or receive mode by a user. In the transmit mode, our arrangement causes the receiver to scan all of the allocated radio frequency channels in the system until an idle channel is found. When an idle channel is found, our arrangement causes the transmitter and receiver to become operable on that channel, then causes the transmitter to transmit a busy tone to acquire and enable the repeater on that channel, and then causes the transmitter to transmit a predetermined group tone or tones associated with the particular arrangement. The repeater transmits a busy tone on the channel, and re-transmits the group tone. At each of the other radio transmitters and receivers which are in the receive mode, our arrangement causes the receiver to continuously scan all of the allocated radio frequency channels for its predetermined group tone or tones. When the receiver detects its predetermined group tone or tones on a channel, our arrangement stops the receiver scanning, and enables the transmitter and receiver on that channel for communication through the repeater with the transmitter and receiver in the transmit mode. There may be a plurality of such transmitters and receivers associated with a predetermined group tone or tones. Thus, we provide a new and improved arrangement or method for establishing radio communication between vehicles through a repeater.

BRIEF DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawing, in which:

FIGS. 4A through 4D, when taken together, show a detailed circuit diagram of our arrangement for use on a mobile vehicle; and FIG. 5 shows how FIGS. 4A through 4D are related and joined together.

DESCRIPTION OF THE PREFERRED EMBODIMENT

Background

Figure 1:
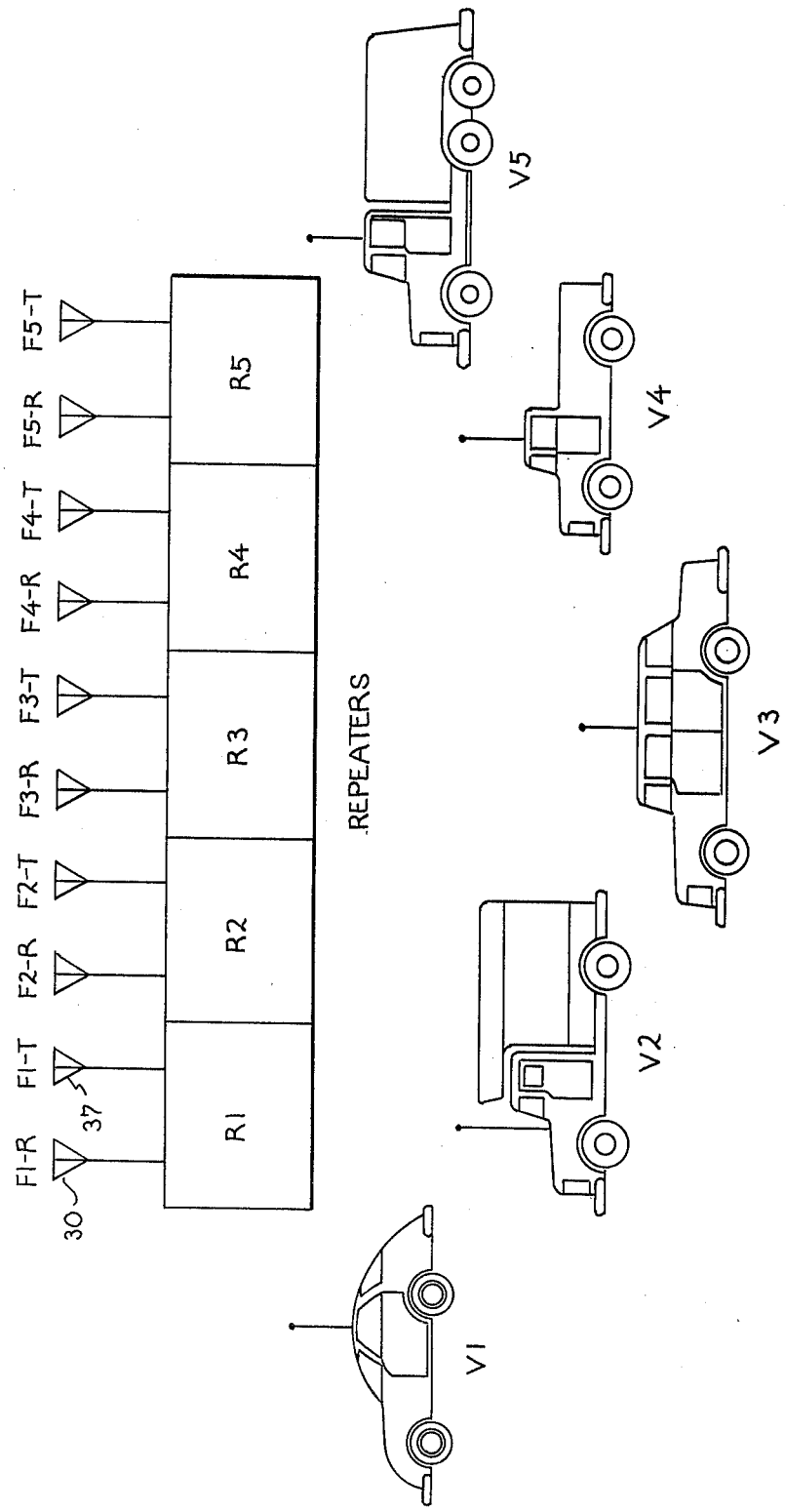
FIG. 1 shows a typical application of a land mobile communication system for which our arrangement or method is intended.

A better understanding of the need for and use of our arrangement or method can be obtained with reference to FIG. 1. In FIG. 1, we have assumed that a given locality has been allocated five radio repeater communication channels (for example in bands around 850 Megahertz), each channel having a different radio transmitting frequency and a different radio receiving frequency. For five channels, five repeaters R1 through R5 are provided and located at an available site that provides the best radio frequency coverage. Each of the repeaters R1 through R5 includes a transmitter, a receiver, a transmitting antenna, and a receiving antenna. For simplex operation in the first repeater R1, the receiver and receiving antenna would function on a frequency F1-R, and the transmitter and transmitting antenna would function on a frequency F1-T which is spaced from the frequency F1-R by the amount to provide good frequency separation for the transmitter and receiver. Other frequencies F2-R and F2-T through F5-R and F5-T would be provided for the repeaters R2 through R5. In the same locality, different groups of users may utilize the repeaters with the radio transmitters and receivers in their mobile vehicles V1 through V5, for example. Typically, each group has a common basis, such as the vehicles in a given business, for example taxi cabs or a fleet of oil delivery trucks. The number of groups which a repeater can serve depends, among other things, upon the number of vehicles in a group, the amount of time a radio channel is used, and the number of repeater channels available. For example, five repeaters (each including a transmitter and receiver operating on frequencies different from the other repeater transmitters and receivers) can serve as many as two thousand vehicles. However, the number of vehicles which can be efficiently served may change depending upon the demand for the channels.

If there are a number of repeater channels available in a given locality, it is desirable that a group of vehicles be able to quickly ascertain which channel or frequencies are available, so as to establish communication with the other vehicles in that same group. Our invention provides an arrangement or method for providing and establishing this communication in a relatively simple but reliable fashion.

General Description

Figure 2:
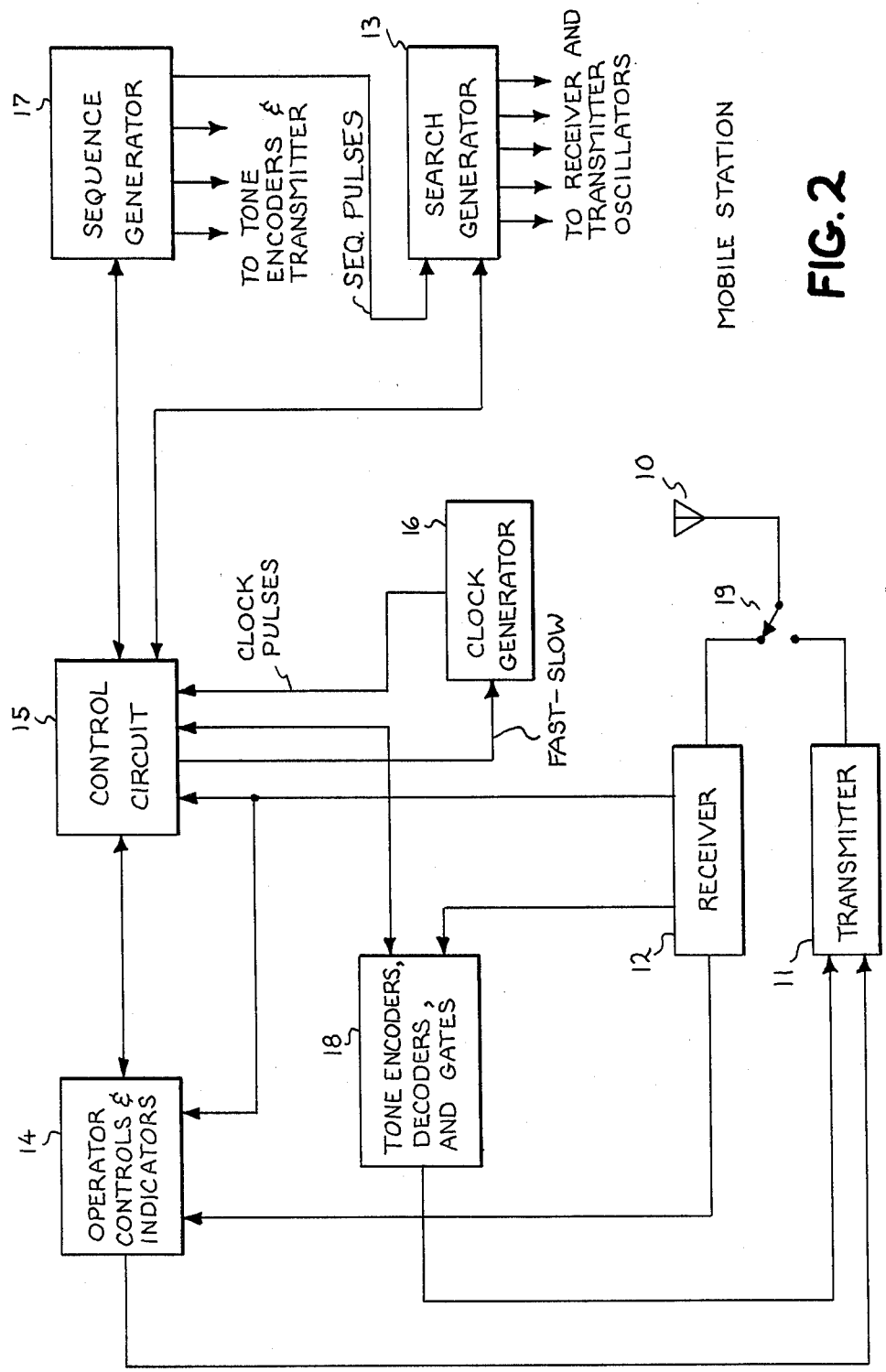
FIG. 2 shows a block diagram of our arrangement for use on a mobile vehicle.

FIG. 2 shows a block diagram of our arrangement for use in a mobile station, such as on a vehicle. In FIG. 2, we have assumed that the vehicle is in the group of vehicles V1 through V5 shown in FIG. 1. The vehicle station includes a radio transmitter 11 capable of operating on any of the frequencies F1-R through F5-R, and a radio receiver 12 capable of operating on any of the frequencies F1-T through F5-T. Two frequencies are needed for each channel in order that the vehicles and the repeater can function in a simplex or push-to-talk arrangement. Thus, this vehicle would transmit on a repeater receive frequency (for example F1-R). This frequency F1-R would be received by the repeater and transmitted to the other vehicles on the frequency F1-T. The other vehicles in the group would receive this repeater frequency F1-T. When transmitting, the other vehicles would transmit on the frequency F1-R. In such an arrangement, a single antenna 10 is switched by a relay 19 between the vehicular or mobile transmitter 11 and receiver 12, depending upon whether the vehicle or mobile station is transmitting or receiving. If full duplex operation is provided, four frequencies would be needed by each repeater for each channel. We have assumed that the transmitter 11 and receiver 12 are frequency modulation devices, although they may be amplitude modulation devices. The transmitter 11 includes an oscillator circuit which operates at one of five frequencies depending upon the signal applied to it by a search generator 13. The receiver 12 is preferably of the superheterodyne type and includes a local oscillator which also operates at one of five frequencies depending upon the signal supplied by the search generator 13. Clock signals are provided by a generator 16 at a fast or slow rate determined by a control circuit 15. The search generator 13 is supplied with these clock signals which cause the generator 13 to sequentially produce frequency scanning signals at each of the five outputs shown in FIG. 2. These scanning signals are applied to the transmitter and receiver oscillators to cause the transmitter 11 to be sequentially operable on the radio frequencies F1-R through F5-R, and the receiver 12 to be sequentially operable on the radio frequencies F1-T through F5-T. Tone encoders, decoders, and gates 18 are provided for decoding or filtering tones received by the receiver 12 and for encoding or producing tones to be gated and transmitted by the transmitter 11. The mobile station includes operator controls and indicators 14 to enable the operator or user to operate his station and to have indications of the operation of his station. The operator controls permit the operator to place his transmitter and receiver in the call originate or transmit mode to establish communication with another vehicle in the same group, or to place his transmitter and receiver in the idle or receive mode so that he will receive communications from other mobile transmitters or stations in the same group.

The control circuit 15 supplies the clock signals from the clock generator 16 to a sequence generator 17 when the operator controls place the station in the transmit mode, or to the search generator 13 when the operator controls place the station in the receive mode. In the transmit mode, the control circuit 15 supplies clock pulses to the sequence generator 17 to cause the sequence generator 17 to produce signals which provide the following sequence of functions: first, locate an idle channel; second, transmit an audible busy tone to the repeater to acquire and enable or activate the repeater transmitter and receiver on the idle channel; third, transmit an audible group tone (of selected frequency) which is repeated or retransmitted by the repeater to signal all other stations in the same group; fourth, transmit an audible subgroup tone (of selected frequency) if the stations in a given group are further subdivided into subgroups; fifth, stop transmitting and cause the mobile receiver to listen and ascertain whether the repeater is sending out a transmission with a busy tone on the selected channel; and sixth, repeat the sequence if the repeater transmitter was not enabled or activated in the second function. If the repeater transmitter was activated, then indications are provided to the operator that he has acquired and activated the repeater, and that his station and the repeater are ready for operation.

In the receive mode, the control circuit 15 supplies clock pulses to the search generator 13 to cause the generator 13 to produce signals for changing the frequency of the transmitter and receiver oscillators. This causes the receiver 12 to sequentially tune to each of the five frequencies on which the repeater can transmit, and at the same time causes the transmitter 11 to sequentially tune to each of the five companion or associated frequencies on which the repeater can receive. If no appropriate signal or tone is detected on a frequency, the generator 13 causes the receiver and transmitter to rapidly tune to the next channel frequencies. This sequence is continued as long as the receiver 12 is operable, and stops only when the receiver 12 receives a busy tone, its predetermined group tone, and its subgroup tone if utilized. If the group tone and subgroup tone (if used) are received, the control circuit 15 provides an indication to the operator that he is being called. The operator can then pick up his handset or microphone and communicate with the calling station.

Figure 3:
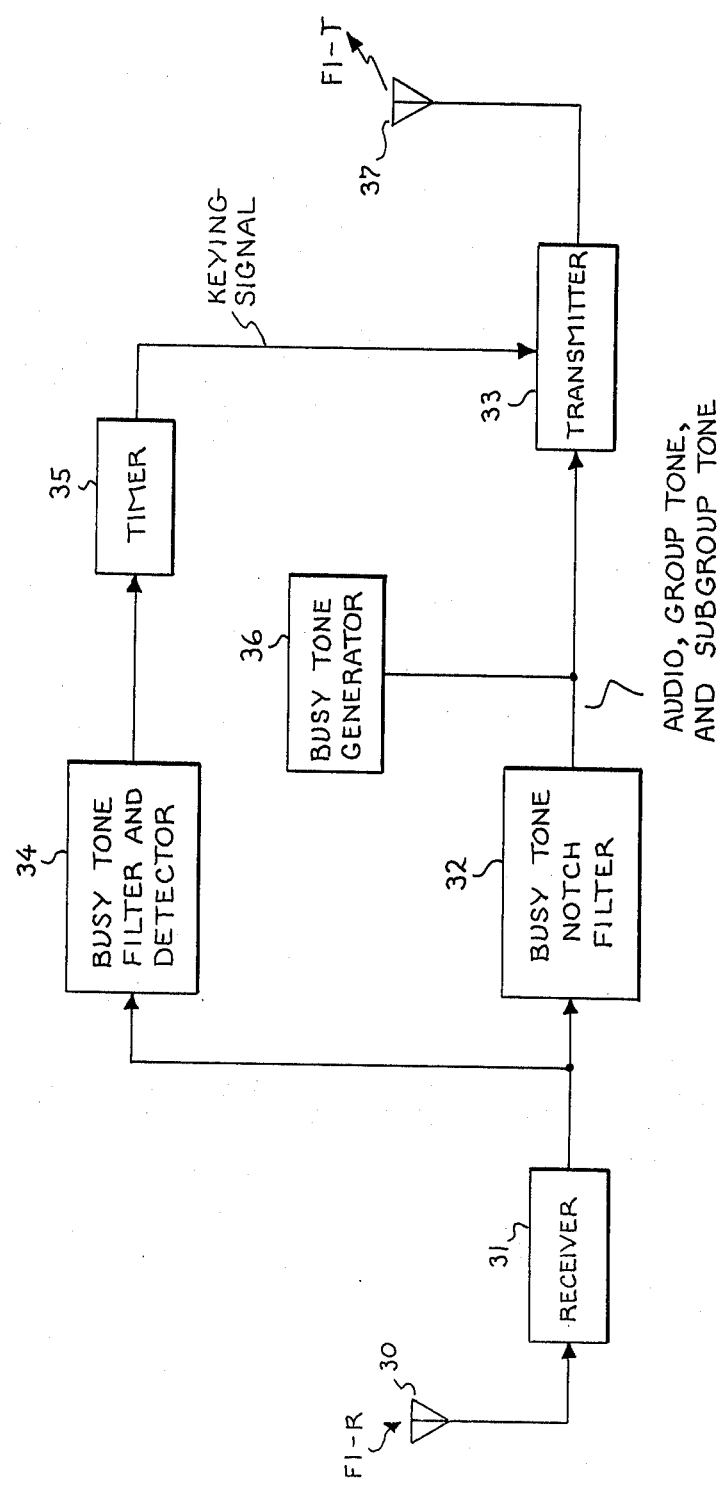
FIG. 3 shows a block diagram of our arrangement for use at a repeater.
Figure 4A:
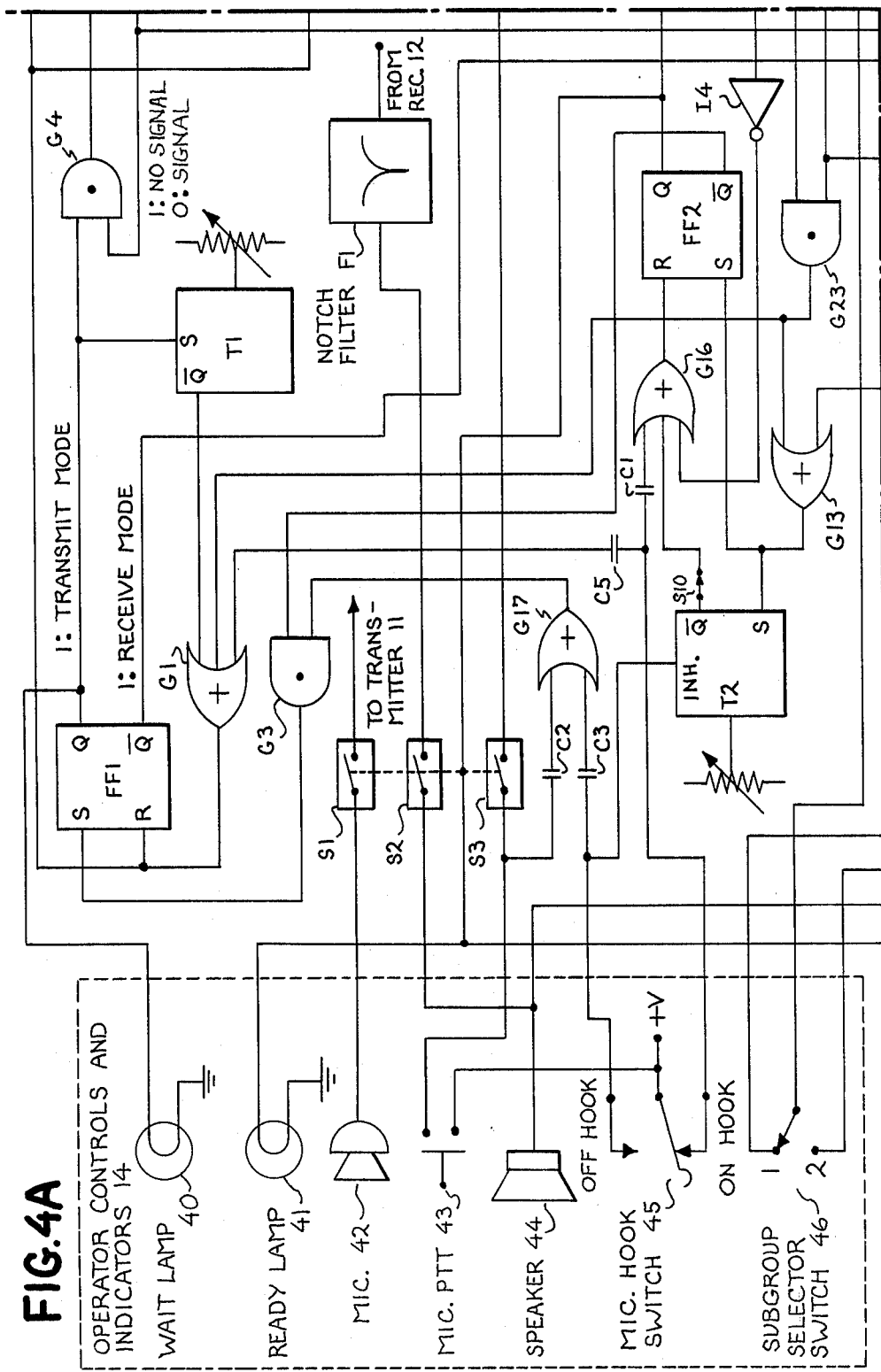
Figure 4B:
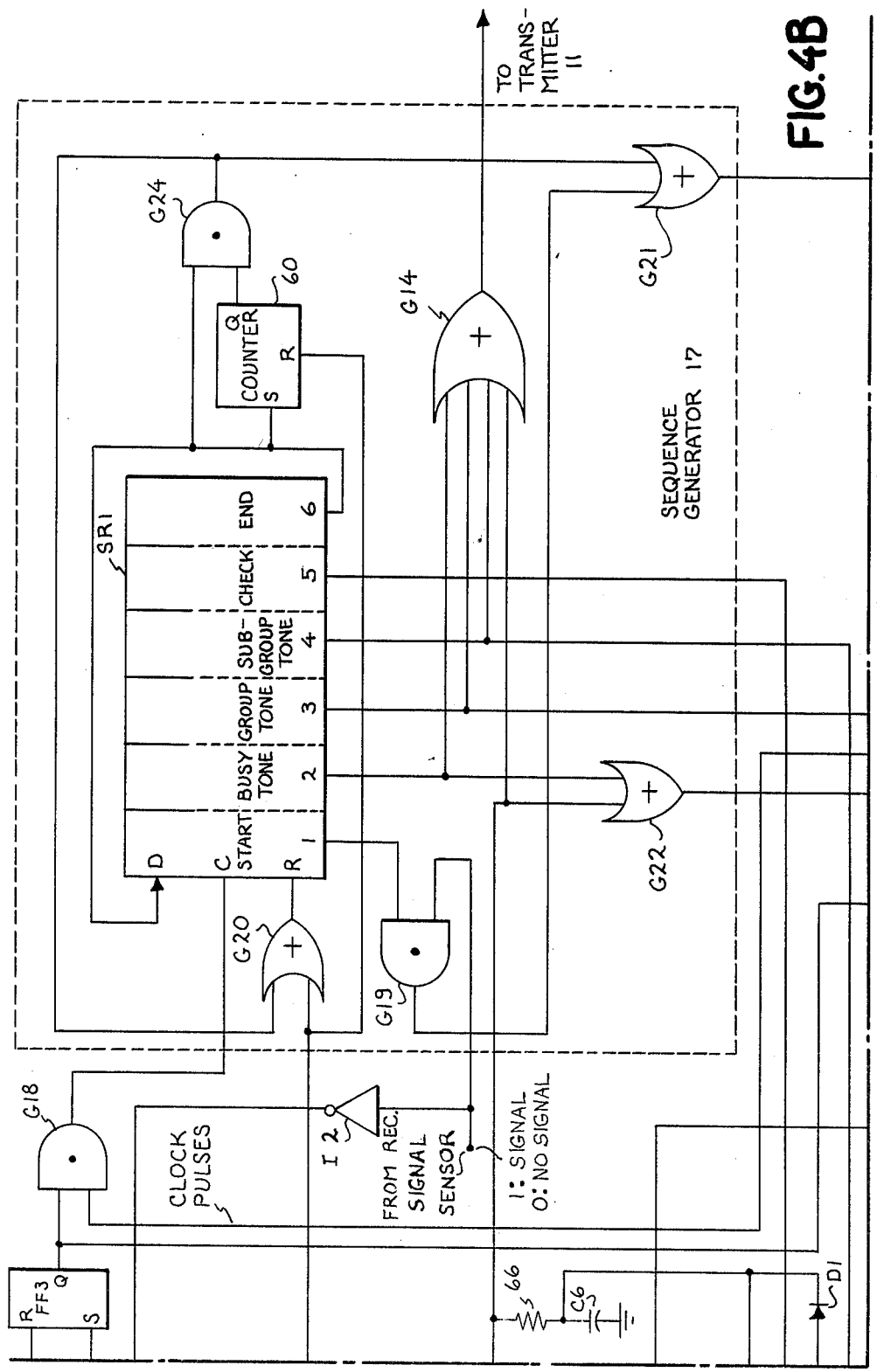

FIG. 3 shows a block diagram of one of the repeaters of FIG. 1 for use with the control arrangement in accordance with our invention. In this repeater, an antenna 30 is connected to a receiver 31 for receiving a particular frequency, for example F1-R. The receiver output is connected to a busy tone notch filter 32 which filters out or rejects the busy tone, but applies the received audio signals, group tone, and subgroup tone to a transmitter 33. The transmitter 33 is connected to an antenna 37 for transmitting on a companion channel frequency F1-T. The companion channel frequencies F1-R, F1-T are separated sufficiently for proper circuit operation. It is possible to operate the receiver 31 and transmitter 33 on the same antenna, or to operate all of the repeaters on the same antenna. The receiver output is also applied to a busy tone bandpass filter and detector 34 which detects only the busy tone frequency and applies the busy tone detection signal to a timer 35. The timer 35 produces an enabling or keying signal at the beginning of and as long as a busy tone is detected, and for a selected period (for example 10 seconds) after termination of the body tone. This enabling or keying signal turns on or enables the transmitter 33. When the enabling signal ends, the transmitter 33 is turned off automatically without the need for an idle tone. This feature prevents the repeater transmitter 33 from being erroneously keyed or enabled in the absence of a proper busy tone signal. The timer 35 also permits a repeater to become available to another subsequent group if transmissions by the acquiring group do not occur every so often, for example every 10 seconds. The repeater also includes a busy tone generator 36 which is applied to the transmitter 33 along with the audio, group, and subgroup tones. We prefer that the busy tone be regenerated at the repeater so as to insure that the mobile stations are kept in operative condition even though there is a momentary absence (for example a few seconds less than 10) of any mobile station transmission. However, the group and subgroup tones are passed from the mobile transmitter through the repeater receiver and transmitter. The individual blocks of FIG. 3 are known in the art, so that a more detailed description of them is not believed to be necessary. Each of the repeaters of FIG. 1 is similar to FIG. 3, but operates at different frequencies.

Detailed Description—Circuit Elements

FIGS. 4A through 4D show a detailed circuit diagram of our mobile station communication establishing arrangement of FIG. 2. FIGS. 4A through 4D form a single FIG. 4 when arranged as shown in FIG. 5 with correspondingly positioned circuit leads (at the figure edges) connected together. For clarity, the transmitter 11, the receiver 12, and the antenna 10 of FIG. 2 have been omitted. In FIG. 4, the search generator 13; the clock generator 16; the tone encoders, decoders, and gates 18; the operator controls and indicators 14; and the sequence generator 17 are shown enclosed in respective dashed line rectangles. The remainder of the circuit outside these rectangles comprises the control circuit 15. Our circuit of FIG. 4 comprises four type of logic gates, namely an OR gate such as G1, a NOR gate such as G2, an AND gate such as G3, and an inverter such a I1. As known in the art, an OR gate produces a logic 1 at its output in response to any of its inputs being at a logic 1, and produces a logic 0 at its output in response to all of its inputs being a logic 0. A NOR gate produces a logic 0 in response to any of its inputs being at a logic 1, and produces a logic 1 in response to all of its inputs being at a logic 0. An AND gate produces a logic 0 in response to any of its inputs being at a logic 0, and produces a logic 1 in response to all of its inputs being at a logic 1. An inverter simply produces the logic inversion of the signal applied to its input. In our circuit, we have assumed that a logic 1 is a positive voltage $+V$, and that a logic 0 is zero volts or ground. However, other voltages may be utilized for the logic 1 and logic 0.

Our circuit utilizes a number of bistable flip-flops, such as the flip-flop FF1. The flip-flop FF1 produces a logic 1 at its $\overline{Q}$ output and a logic 0 at its Q output in response to a logic 1 being momentarily applied to its set input S; and produces a logic 0 at its $\overline{Q}$ output and a logic 1 at its $\overline{Q}$ input in response to a logic 1 being momentarily applied to its reset input R. Our circuit utilizes a timer T1 which is normally reset to produce a logic 1 at its $\overline{Q}$ output. When the timer T1 is set in response to a logic 1 being applied to its set input S, it produces a logic 0 at its $\overline{Q}$ output for a predetermined time (approximately 10 seconds in a preferred embodiment). After the predetermined time expires, the timer T1 resets so that its $\overline{Q}$ produces a logic 1. The predetermined time is adjustable by means of a resistor circuit associated with the timer T1. A timer T2 is also provided. This timer is similar to the timer T1, but has a predetermined time-out period of approximately 15 seconds in a preferred embodiment. The timer T2 further includes an inhibit input INH. If the timer T2 is set and if the inhibit input INH is supplied with a logic 1, the timer T2 will continue to produce a logic 0 at its $\overline{Q}$ output as long as the inhibit logic 1 is applied. After the inhibit logic 1 is removed, the timer T2 becomes reset and its $\overline{Q}$ output returns to a logic 1.

The clock generator 16 includes a pulse oscillator that produces logic 1 pulses of approximately 10 milliseconds duration at a fast rate (approximately every 30 milliseconds) in response to a logic 1 applied to a speed control input SC, and at a slow rate (approximately every 60 milliseconds) in response to a logic 0 applied to its input SC. These pulses are produced at a Q output.

The sequence generator 17 includes a six stage shift register SR1 having a clock input C, a reset input R, and a feedback input D. When the shift register SR1 is in an initial or reset condition, a logic 1 is present in stage 1, and all other stages are at a logic 0. This logic 1 is sequentially passed through the subsequent stages 2 through 6 in response to clock signals. The stages may include a number of substages, depending upon the timing function required for a given stage. In a preferred embodiment stage 1 had one substage; stage 2 had 2 substages; stage 3 had 6 substages for a five channel system; stage 4 had 2 substages; stage 5 had 5 substages; and stage 6 had one substage. This is a total of 17 substages which, for a clock pulse rate of 60 milliseconds, would require about 1.02 seconds for one sequence through the shift register SR1. Stage 3 preferably has a period sufficiently long so that each receiver in a group has sufficient time to scan all channels for a group tone if it is present. Stage 5 preferably has a time period sufficiently long so that activation of the repeater can be determined. These times will be discussed in more detail subsequently. When the logic 1 reaches stage 6, it is fed back to the feedback input D for subsequent passage through the stages. A count by two counter 60 is connected to stage 6 to produce a logic 1 at its output in response to every other logic 1 at stage 6. In the search generator 13, a five stage shift register is provided for the five channel frequencies. Each of these stages has only one substage. A logic 1 is passed from one stage to a subsequent stage in response to a clock pulse at the clock input C. When the logic 1 reaches the stage 5, the next clock pulse causes it to be fed back to the feedback input D for a subsequent shift through the stages.

In the tone encoders, decoders, and gates 18, we provide four tone encoder-decoder circuits TC1 through TC4. Each of these circuits includes a decoder portion having a tone input T connected to the audio output of the receiver 12. The decoder portion includes a filter and produces a logic 1 at its Q output in response to a tone of predetermined frequency. While we have shown the circuits TC3, TC4 with their Q outputs applied to the OR gate G11, the Q outputs could also be switched for individual selection by another section of the switch 46. Each of the circuits also includes an encoder portion which produces a particular tone frequency depending upon the intended function of the tone. For the busy tone, we prefer a relatively high audio frequency of 3000 Hertz, since the higher frequency passes through filters and operates more quickly. The group and subgroup tones may be any suitable frequency, but are preferably in the voice range of audio frequencies transmitted, namely between about 400 and 3000 Hertz. Each of the circuits TC1 through TC4 acts an encoder in response to a logic 1 applied to a control input C, and acts as a decoder in response to a logic 0 applied to its control input C. The outputs of the encoder portions of the circuits TC1 through TC4 are selectively applied through switches S4 through S7 to a tone amplifier 51. The output of this amplifier 51 is connected to the transmitter 11 for modulating the transmitted signals in accordance with the tone. In the tone encoders, decoders, and gates 18, we provide a tone burst generator 50 which, along with the ready lamp 41, provides a short audible indication to the operator that he has received a call, or that he has enabled the repeater to transmit.

In our circuit, we also utilize a plurality of switches S1 through S7 indicated by a switch arm contained in a rectangle. Because our circuit operates with logic signals, the switches S1 through S7 should be fast operating, so that we prefer some devices such as an FET transistor. Each of the switches S1 through S7 responds to a logic signal applied to a lead indicated as a dashed line in contact with the switch arm. Each switch opens its switch path in response to a logic 0, and provides a closed path in response to a logic 1.

In the operator controls and indicators 14, we provide a wait lamp 40 to indicate to an operator that his control arrangement is looking for a channel; a ready lamp 41 to indicate to an operator that his control arrangement has enabled the transmitter and receiver for operation; a microphone 42 for transmitting voice signals; a microphone push-to-talk button 43 to key or energize the transmitter for transmission; a loudspeaker 44 for hearing received audible signals; a microphone hook switch 45 having an on hook position when the microphone 42 is placed on the switch 45, and an off hook position when the microphone 42 is removed from the switch 45; and finally a subgroup selector switch 46 if subgroup tones are utilized. We also provide a notch filter F1 connected between the receiver audio output and the loudspeaker switch S2 to remove the busy tone (preferably 3000 Hertz) which would otherwise be heard by an operator. If desired, the microphone 42 and loudspeaker 44 may be replaced by other devices, such as a telephone handset which can be placed on the hook switch 45.

DETAILED DESCRIPTION —Idle or Receive Mode

When an operator is in his mobile unit and is expecting to be called at any time, he places our arrangement in the receive mode by turning his transmitter and receiver on. This provides power to our arrangement, and the voltage +V is applied as a logic 1 through the on hook contact of the switch 45, the capacitor C5 to reset the flip-flop FF1, FF3 if they are not already reset, and the capacitor C1 and OR gate G16 to reset the flip-flop FF2 if it is not already reset. However, the transmitter is not keyed or radiating, and the mobile antenna is connected to the receiver. If conditions require distinction between mobile stations in a group, subgroup tones (one for each desired subgroup) may be provided. In FIG. 4, we have assumed that there are two subgroups available, and that the station shown is in subgroup 1. Hence, the subgroup selector switch 46 is connected to subgroup contact 1. This connects tone circuit TC3 for subgroup 1 into the circuit, and disconnects tone circuit TC4 for subgroup 2 from the circuit. In the receive mode, the reset flip-flop FF1 $\overline{Q}$ output is at a logic 1 and its Q output is at a logic 0. The flip-flop FF3 is also reset so that its Q output is a logic 0. This causes the AND gate G18 to produce a logic 0 and prevents clock pulses from being applied to the shift register SR1 in the sequence generator 17. The logic 1 produced by the $\overline{Q}$ output of the flip-flop FF1 is inverted to a logic 0 by the inverter I1. This logic 0 causes the AND gate G8 to produce a logic 0. If no signal is present, the sensor connected to the receiver circuit is at a logic 0. This sensor may detect a carrier signal, or busy tone, or group tone as desired. We prefer that the sensor detect the busy tone frequency. The logic 0 (for no signal) is changed to a logic 1 by the inverter I2 and applied to the AND gate G9 along with the logic 1 from the $\overline{Q}$ output to the flip-flop FF1. The AND gate G9 produces a logic 1 which causes the OR gate G10 to produce at logic 1 so that the speed control input SC causes the clock generator 16 to produce pulses at a fast rate (every 30 milliseconds for example). The logic 0 produced by the inverter I1 causes the tone circuits TC2, TC3, TC4 to decode. The output of the OR gate G22 is a logic 0 which causes the tone circuit TC1 to also decode. But if no tones have been received at this time, the Q outputs of the decoders TC1, TC2, TC3, TC4 are at a logic 0. Hence, the gate G5 produces a logic 0. The flip-flop FF2 is also reset so that its Q output is at a logic 0 and its $\overline{Q}$ output is at a logic 1. Under this condition, all inputs to the NOR gate G2 are at a logic 0 so that this gate G2 produces a logic 1. This logic 1 permits the AND gate G6 to pass the logic 1 clock pulses as they are produced (at the fast rate at this time) by the generator 16. These clock pulses are passed by the AND gate G6 and the OR gate G7 to the clock input C of the shift register SR2 of the search generator 13. This causes the logic 1 to be passed through stages 1 through 5 in sequence. As this logic 1 is passed through each stage, it changes the oscillator frequencies in the transmitter and receiver of the mobile station so that the transmitter and receiver are tuned to the frequencies F1R and F1T, F2R and F2T, F3R and F3T, F4R and F4T and F5R and F5T in sequence.

If a signal is detected on a channel by the receiver, the signal sensor produces a logic 1. This logic 1 is inverted to a logic 0 by the inverter I2 so that the AND gate G9 produces a logic 0. At this time, both inputs to the OR gate G10 are at a logic 0 so that the generator 16 switches to its slow pulse rate (every 60 milliseconds for example) to give the receiver circuits sufficient time to detect a busy tone, a group tone, and a subgroup 1 tone if they are present. If a busy tone is present, the busy tone decoder TC1 produces a logic 1 at its Q output. If a proper group tone is also detected, the group tone decoder TC2 produces a logic 1 at its Q output. This logic 1 is held sufficiently long by a capacitor C4 for detection of the subgroup 1 tone. With receipt of the busy tone and group tone, the tone decoders TC1 and TC2 produce a logic 1 at their Q outputs. This causes the AND gate G5 to produce a logic 1 and the NOR gate G2 to produce a logic 0. This logic 0 prevents clock pulses from passing through the AND gate G6 so that the search generator 13 is held with the logic 1 in the stage of the shift register SR2 which activated the receiver oscillator (and also the transmitter oscillator) associated with the channel frequency on which the busy and group tones were detected. If the proper subgroup 1 tone is detected, then the tone decoder TC3 produces a logic 1 at its Q output. This logic 1 is passed by the OR gate G11. When the decoders TC1, TC2, TC3 simultaneously produce a logic 1, the AND gate G12 produces a logic 1 which is passed by the OR gate G13 to set the flip-flop FF2, and to also set and start the timer T2. When the flip-flop FF2 becomes set, its Q output supplies a logic 1 which causes the NOR gate G2 to continue producing a logic 0 that blocks the clock pulses in the AND gate G6. This logic 1 from the Q output of the flip-flop FF2 closes the three switches S1, S2, S3. Closed switch S1 connects the microphone 42 to the transmitter; closed switch S2 connects the loudspeaker 44 through the filter F1 to the receiver audio output; and closed switch S3 connects the push-to-talk button 43 to an OR gate G14 for keying the transmitter. The logic 1 from the Q output of the flip-flop FF2 also turns on the ready lamp 41 and energizes the tone burst generator 50 (connected to the loudspeaker 44) to indicate to the operator that he is receiving a call. The transmitter and receiver of the mobile unit are tuned to the proper transmit and receive frequencies for communicating with the repeater to other mobile units in the group.

If the operator responds promptly (within the preferred 15 seconds timing period of the timer T2) by removing his microphone 42 from the hook switch 45, or if his microphone 42 is already removed, the switch 45 supplies a plus voltage or logic 1 to the off hook contact. The logic 1 from the off hook contact inhibits the timer T2 from being reset, and thus maintains the $\overline{Q}$ output at a logic 0. Hence, the flip-flop FF2 remains in the set condition. When the operator wishes to talk, he depresses his microphone push-to-talk button 43 which provides a logic 1 through the closed switch S3 to the OR gate G14 to key the transmitter and cause it to radiate and to cause the antenna relay to switch to the transmitter position. Each time the button 43 is depressed, a logic 1 is applied to the OR gate G22 to cause busy tone to be transmitted so as to keep the repeater timer 35 producing an enabling signal. Upon release of the push-to-talk button 43, the transmitter is unkeyed and the antenna relay switches to the receive position so that the operator can hear signals in his loudspeaker 44. If the operator does not remove his microphone 42 before the timer T2 times out, the $\overline{Q}$ output returns to a logic 1 which resets the flip-flop FF2. This causes the NOR gate G2 to produce a logic 1 that permits the gate G6 to pass clock pulses to the search generator 13. Hence that operator's receiver will return to the receive mode and scan, and he will miss the messages after the flip-flop FF2 resets. If it is desired to keep the user on his channel even if he does not go off hook, the timer T2 may be omitted by simply opening a switch S10 to remove its $\overline{Q}$ output from the OR gate G16, and thus eliminate the timing function from the circuit. In that case, the user will remain on the channel as long as there is activity. When transmissions cease, the Q output of the busy tone decoder TC1 becomes a logic 0. This permits a capacitor C6 to discharge to logic 0, so that the inverter I4 produces a logic 1 that is passed by the OR gate G16 to reset the flip-flop FF2 for scanning.

When the operator is through communicating, he places his microphone 42 back on the hook switch 45. This causes a plus voltage or logic 1 to be applied to the on hook contact. This logic 1 is momentarily passed by a capacitor C1 through the OR gate G16 to reset the flip-flop FF2. When the flip-flop FF2 is reset, its Q output returns to a logic 0. The logic 1 from the on hook contact is also momentarily passed by the capacitor C5 and the OR gate G3 to reset the flip-flops FF1, FF3 if they are not already reset. Removal of the tones causes the gate G5 to produce a logic 0. The flip-flop FF3 is still reset to produce a logic 0. Hence, the NOR gate G2 produces a logic 1 that permits clock pulses to pass through the gate G6 and cause the search generator 13 to begin searching once again. This searching is at the fast rate because both inputs to the AND gate G9 are at a logic 1.

In brief summary, when our arrangement is in the receive mode, the shift register SR2 causes rapid scanning until a signal is detected. This changes the scanning to the slow mode. If the busy tone and the proper group and subgroup tones are received, scanning stops, and an indication is provided to alert the user of a call. The user has a predetermined time (15 seconds) to go off hook and communicate. If he does not go off hook, scanning resumes after the predetermined time, if used.

Detailed Description—Call Originate or Transmit Mode

Again, it is assumed that the mobile unit is using the group tone and subgroup 1 tone, and that this subgroup 1 tone has been selected by the subgroup selector switch 46 engaging contact 1 for connecting the tone circuit TC3 into the circuit. The search generator 13 is scanning the channels in the fast mode since both inputs to AND gate G9 are at logic 1. The operator may initiate the call originate or transmit mode by either momentarily depressing his push-to-talk button 43 or removing his microphone 42 from the hook switch 45. Either option causes a positive voltage or logic 1 to be momentarily applied by the respective capacitors C2, C3 to the OR gate G17. This logic 1 is applied to the AND gate G3 along with the logic 1 from the $\overline{Q}$ output of the reset flip-flop FF2. The AND gate G3 produces a logic 1 that sets the flip-flop FF1 and places it in the call originate or transmit mode. The Q output of the flip-flop FF1 switches to a logic 1 which turns on the wait lamp 40 to indicate to the operator that he must wait until a channel is established. This Q output logic 1 is also applied to the set input S of the timer T1 so that its Q output produces a logic 0 for a predetermined time. This predetermined time is preferably in the order of a little more than 10 seconds, or sufficient time for the sequence generator 17 to run through its entire sequence at least twice for each channel. (If proper communication is not established after two entire sequences, the resetting of the timer T1 causes its $\overline{Q}$ output to produce a logic 1 that resets the flip-flop FF1 to the idle or receive mode.) The logic 0 at the $\overline{Q}$ output of the set flip-flop FF1 causes AND gate G9 to produce a logic 0 so that the rate of the pulses produced by the clock generator 16 is now controlled by the gate G8. The logic 1 from the Q output of the set flip-flop FF1 is also applied to the AND gate G4 along with whatever logic is being produced by the inverter I2. If, at the time the operator switched to the call originate mode, his search generator 13 was on a busy channel, the receiver signal sensor produced a logic 1 which was inverted to a logic 0 so that the gate G4 produces a logic 0. This permits continued searching. When the search generator 13 reaches an idle channel (indicated by lack of a carrier or by lack of a busy tone), the receiver signal sensor produces a logic 0. This logic 0 is inverted to a logic 1 by the inverter I2 so that the gate G4 produces a logic 1. This logic 1 sets the flip-flop FF3 and its Q output produces a logic 1 for the remainder of the call originate sequence. This logic 1 from the flip-flop FF3 causes the NOR gate G2 to produce a logic 0 so that the gate G6 prevents the clock pulses from reaching the search generator 13 for the remainder of the call originate sequence. The logic 1 from the flip-flop FF3 is applied to the AND gate G18 to permit the clock pulses from the generator 16 to be applied to the clock input of the shift register SR1. The shift register SR1 was previously reset so that the circulating logic 1 was in stage 1.

The clock generator 16 produces pulses at the fast rate until an idle channel is reached because the logic 0 at the $\overline{Q}$ output of the set flip-flop FF1 is inverted by the inverter I1 to a logic 1 and applied to the AND gate G8 along with a logic 1 from the inverter I3. When an idle channel is reached and the flip-flop FF3 is set, the logic 1 at its Q output is inverted to a logic 0 by the inverter I3 so that the AND gate G8 produces a logic 0. The gate G9 is already producing a logic 0. These two logic 0's cause the generator 16 to produce clock pulses at a slow rate. The pulses are applied through the gate G18 to cause the shift register SR1 to operate in the slow mode. The logic 1 produced by the inverter I1 also places the tone circuits TC2, TC3, TC4 in the encoding mode. At the start of a call sequence, a logic 1 is in stage 1 of the shift register SR1. This logic 1 is applied to an AND gate G19 along with an input from the signal sensor which, with no signal present, produces a logic 0. Hence, the AND gate G19 does not supply a logic 1 to the OR gate G21 and the search generator 13 remains on the idle channel.

In the call originate sequence, the slow rate clock pulses are passed by the gate G18 to cause the logic 1 to shift from stage 1 to stage 2 of the shift register SR1. This logic 1 is applied by the OR gate G22 to the switch S4 and also to the tone circuit TC1 to switch it to the encoding mode. The tone circuit TC1 produces a busy tone of 3000 Hertz which is passed by the switch S4, amplified by the tone amplifier 51, and applied to the mobile transmitter 11. The logic 1 in stage 2 is also passed by the OR gate G14 to key the mobile transmitter 11 so that the busy tone is transmitted to the repeater. As mentioned before, the repeater transmitter 33 of FIG. 3 is enabled by receipt of this busy tone, and transmits a new busy tone on the selected channel to mobile stations. After the appropriate number of clock pulses, the logic 1 in stage 2 is then transferred to stage 3 of the shift register SR1. This transfer opens the switch S4 and removes the busy tone. The transferred logic 1 in stage 3 again passes through the gate G14 to key the mobile transmitter 11. The logic 1 is also applied to the switch S5 associated with the tone circuit TC2. The tone circuits TC2, TC3 are already in the encoding mode. When the switch S5 is closed, the group tone (for example 1050 Hertz) produced by the encoding tone circuit TC2 is applied to the tone amplifier 51 and the keyed transmitter 11 which transmits this group tone to the repeater which retransmits it to the mobile stations. The logic 1 is held in stage 3 for a sufficient length of time to permit all of the search generators in the other mobile stations to pass through all five stages of their shift register SR2, since it is possible that a search generator could have just left the acquired channel at the time communication was being established. Those stations in the designated group begin to respond.

After a suitable number of clock pulses, the logic 1 in the shift register SR1 is shifted from stage 3 to stage 4. This transfer terminates the group tone provided by the encoder in tone circuit TC2. The logic 1 in stage 4 is passed by the gate G14 to key the mobile transmitter 11. This logic 1 is also supplied through the subgroup selector switch 46 and its contact to close the switch S6. (If the selector switch 46 had been in position 2, the logic 1 from stage 4 would have been applied to the switch S7.) The tone from the subgroup tone circuit TC3 (for example 400 Hertz) is passed by the switch S6 to the tone amplifier 51 and applied to the transmitter 11 which is keyed and transmits the tone to the repeater which re-transmits it to the other mobile stations.

After a suitable number of clock pulses, the logic 1 is shifted from stage 4 to stage 5 of the shift register SR1. This transfer terminates the subgroup tone provided by the encoder of tone circuit TC3. Under this condition, no logic 1 is applied to the gate G14, so that the mobile transmitter 11 becomes unkeyed. At this time, both inputs to the OR gate G22 are at a logic 0, and this logic 0 causes the busy tone circuit TC1 to switch to the decode mode. Since the transmitter is unkeyed, the receiver is enabled, and is listening on the selected channel. The repeater should have been enabled and keyed by this time, and busy tone should be present on the channel. If busy tone is present, and received by the call originate mobile receiver, the tone causes the decoder of tone circuit TC1 to produce a logic 1 at its Q output.

This logic 1, along with the logic 1 from stage 5 of the shift register SR1, is applied to the AND gate G23 to cause the gate G23 to produce a logic 1. This logic 1 is applied through the OR gate G1 to the reset input R of the flip-flop FF1 to reset that flip-flop, and stop the calling sequence. Resetting of the flip-flop FF1 extinguishes the wait lamp 40. This logic 1 from the gate G1 also resets the flip-flop FF3, and its Q output switches to a logic 0 to prevent any further clock pulses from passing through the AND gate G18. This logic 1 from the gate G1 resets the counter 60 and passes through the OR gate G20 to reset the shift register SR1. The logic 1 from the gate G23 is also applied through the OR gate G13 to set the flip-flop FF2, and to set or start the timer T2. When the flip-flop FF2 becomes set, its Q output switches to a logic 1 which turns on the ready lamp 41, closes the switches S1, S2, S3, and energizes the tone burst generator 50 so that the operator is alerted that he has obtained a channel. The closed switches S1, S2, S3 connect the speaker 44 to the receiver 12, and connect the microphone 42, and the push-to-talk button 43 through the gate G14 to the transmitter 11. If the operator removes his microphone 42 from the switch 45 before the timer T2 (if used) times out, a positive voltage or logic 1 is applied through the off hook contact to inhibit the timer T2 so that its $\overline{Q}$ output remains at a logic 0 and the flip-flop FF2 remains set. With the flip-flop FF2 held in the set condition, its Q output of a logic 1 insures that the gate G2 produces a logic 0 so that clock pulses cannot be applied to the search generator 13, and cause the established channel to be switched. Each time the operator depresses his push-to-talk button 43, the logic 1 produced passes through the OR gate G22 to cause the tone circuit TC1 to supply busy tone to the mobile transmitter 11.

In the sequence above where a logic 1 was in stage 5 of the shift register SR1, if no busy tone had been detected by the decoder in the tone circuit TC1, the flip-flop FF1 would have remained set, and the flip-flop FF3 would have remained set. This would permit the gate G18 to pass another clock pulse and cause the logic 1 to be shifted from stage 5 to stage 6. This causes a counter circuit 60 to produce a logic 1 at its output. Upon receipt of the next clock pulse, the logic 1 is fed back from stage 6 to the feedback input D in stage 1 of the shift register SR1. Upon receipt of further clock pulses, the sequence described above and starting at stage 1 is repeated. If, when the logic 1 reaches stage 5, a busy tone is heard from the repeater, then the flip-flop FF2 becomes set and the flip-flop FF1 becomes reset to provide the operator an indication that he has acquired a channel. He should take his microphone 42 off hook before the timer T2 (if used) times out and resets. However, if the busy tone is not heard at stage 5 in this second sequence, the logic 1 is shifted to stage 6 which, along with the logic 1 present in the counter 60 causes the AND gate G24 to produce a logic 1 that is passed by the OR gate G20 to reset the shift register SR1. For the times given above (17 stages in the shift register SR1 and 60 milliseconds between pulses), the total time required for two complete sequences through the shift register SR1 is approximately two seconds. The logic 1 from the gate G24 is passed by the OR gates G21, G7 to the clock input C of the shift register SR2 in the search generator 13. This causes the shift register SR2 to shift to the next stage and set the transmitter and receiver frequencies on the next corresponding channel. The clock pulses cause the shift register SR1 in the sequence generator 17 to go through the sequence described above. If the next channel is being used, the receiver signal sensor produces a logic 1 which, with the logic 1 in stage 1 of the shift register SR1, causes the AND gate G19 to produce a logic 1. This logic 1 is passed by the OR gates G21, G7 to shift the shift register SR2 to the next stage (and corresponding channel). This short sequencing continues until an idle channel is found at stage 1 in the shift register SR1, after which the sequence of stage 1 through stage 5 or twice through stage 6 takes place. The longest time required for two full sequences through the shift register SR1 for all five channels is about ten seconds. If no channel is found, the timer T1 resets, and its $\overline{Q}$ output becomes a logic 1. This logic 1 resets the flip-flop FF1 to put the arrangement in the receive or idle mode and extinguishes the wait lamp 40 so that the operator knows he can initiate the call originate mode again.

If a channel is successfully acquired, the operator can communicate. As mentioned earlier, because of the timer 35 provided at the repeater, it is necessary for a busy tone to be received by the repeater during the timing interval in order to retain acquisition of the channel. After the conversation or communication is ended, the control is restored to the search or receive mode by replacing the microphone on the hook switch 45. This causes a positive voltage or a logic 1 to be passed by the capacitor C5 through the OR gate G1 to reset the flip-flops FF1, FF3, and passed by the capacitor C1 through the OR gate G16 to reset the flip-flop FF2. Their Q outputs return to a logic 0. The group tone decoder in the circuit TC2 is producing a logic 0 so that the gate G5 is also producing a logic 0. Hence, all inputs to the gate G2 are at a logic 0 so that the gate G2 produces a logic 1 to permit fast clock pulses from the generator 16 to be passed by the gate G6 to the search generator 13. In the event the mobile operator neglects to hang up the microphone 42 after a conversation has ended and return his radio to the receive or idle mode, a logic 1 from the busy tone circuit TC1 keeps a capacitor C6 charged to a logic 1 through a diode D1. A resistor 66 keeps capacitor C6 charged to a logic 1 during the time the push-to-talk button 43 is depressed. When the repeater times out (and busy tone ends), the capacitor C6 discharges to a logic 0. An inverter I4 produces a logic 1 which is passed by the gate G16 to reset the flip-flop FF2 and returns the control to the idle mode. This prevents a user from accidentally remaining on a channel.

In brief summary, when our arrangement is in the transmit mode, the shift register SR2 causes rapid scanning until an idle channel is found. This causes the shift register SR1 to go through its sequence of causing the transmitter to send busy, group, and subgroup tones to activate the repeater and appropriate mobile stations. If the repeater is activated, an indication is provided to alert the user that he has acquired a channel, and should transmit within a predetermined time (15 seconds). If the repeater is not activated, the shift register SR1 goes through its sequence on the next channel, and so on through each channel until a channel is acquired, or until all channels have been sequenced. If no channel is acquired, the user can start the entire sequence over again and again.

SUMMARY

It will thus be seen that we have provided a new and improved control circuit or method for enabling an operator of a transmitter and receiver to readily and quickly acquire a radio frequency channel from a plurality of such channels for transmitting, or to be called on an available channel. Our control arrangement is relatively simple, and does not require extensive or complex circuits. While we have shown only one embodiment of our invention, persons skilled in the art will appreciate the many modifications that may be made. For example, we have shown a 5 channel system, but there may be almost any number of channels and repeaters. However, good trunking practice limits the channels to about 20. Different logic circuit arrangements and logic levels may be used, such as a microprocessor circuit. The various circuits may have almost any desired timing periods, particularly those in the shift register SR1 and in the timing circuits T1, T2. The timers and counters may be in analog or digital form. Also, the timer T2 may be omitted by disconnecting its $\overline{Q}$ output from the gate G16 so that a user in the receive mode does not have to go off hook to remain on the established channel. These are matters of preference and expediency depending upon the particular communication conditions involved. If a system is free from radiation interference, the busy tone may be omitted and operation made dependent upon the proper carrier. Otherwise, we prefer that the receiver signal sensor produce a logic 1 in response to a busy tone, and a logic 0 in response to the absence of busy tone. In the receive or idle mode, the requirement for a busy tone may be omitted from the AND gate G12 by connecting the switch S8 to logic 1 (+V), and may be omitted from the AND gate G5 by connecting the switch S9 to logic 1 (+V). In the call originate or transmit mode, the stage 1 of the shift register SR1 can be omitted. The fast-slow gates G8, G9, G10 may be omitted, and the clock generator 16 made to run at a single rate. While we have shown one group circuit and two subgroup circuits, one of which is selectable, additional subgroups may be provided to provide further selection of the particular mobile units being called. Or, less subgroup circuits may be provided so that a more general or less select group of mobiles may be called. Or, group and subgroup tones may be transmitted simultaneously rather than sequentially, or may be frequency stepped functions of one common encoder and decoder. Our arrangement may also be used directly between mobile stations without the use of the repeater. Persons skilled in the art will also appreciate that with a repeater transmitter frequency and a repeater receive frequency, only push-to-talk or simplex operation can be provided. However, additional channels may be provided so that full duplex operation can be provided. Again, this is a matter of preference and frequency availability. While we prefer that our busy tone frequency be above the audio frequency, for fast operation, the busy tone may be almost any desired frequency. Likewise, the group and subgroup tones may be almost any desired frequency. However, we believe it preferable that the busy tone be at a frequency just above the transmitted audio frequencies, and that the group and subgroup tones be in the band transmitted voice frequencies. This presents no problem, since the group and subgroup tones are transmitted only when communication is being established. Therefore, while our invention has been described with reference to a particular embodiment, it is to be understood that modifications may be made without departing from the spirit of the invention or from the scope of the claims.

What we claim as new and desire to secure by Letters Patent of the United States is:

1. An arrangement for establishing communication over one of a plurality of radio frequency channels between a first one of a plurality of radio stations and a second one of the plurality of radio stations through a repeater station, said arrangement comprising:
   a. first means for placing said first station in an idle mode and for causing said first station to scan said radio frequency channels;
   b. second means for stopping the scan caused by said first means in response to a predetermined group signal transmitted by said repeater on one of said channels, and enabling said first station to be operated on said one channel in response to said predetermined group signal thereon;
   c. third means for alternatively placing said first station in a call originate mode and for causing said first station to scan said radio frequency channels; and
   d. fourth means for stopping the scan caused by said third means on one of said channels and listening for a predetermined busy signal on said one channel and in response to the absence of said predetermined busy signal on said one channel, determining that said one channel is non-busy and enabling said first station to be operated on said non-busy channel in response to said absence of said predetermined busy signal thereon, and in response to the presence of said predetermined busy signal, continuing said scanning.

2. The arrangement of claim 1 and further comprising fifth means for causing said first station enabled by said fourth means to transmit a busy signal on said one channel to said repeater to operate said repeater transmitter, and for causing said first station to then listen for said operated repeater transmitter on said one channel.

3. The arrangement of claim 2 wherein said operated repeater transmits said busy signal on said one channel in response to receiving said busy signal from said first station.

4. The arrangement of claim 2 or 3 wherein said fifth means further includes means for causing said first enabled first station to transmit said predetermined group tone.

5. An arrangement for establishing communication over a two-frequency radio channel between a first station and a second station through a repeater, said arrangement comprising:
   a. first means for placing said first station in an idle mode and for causing said first station to scan radio frequency channels, to stop said scanning in response to a predetermined group signal on one of said channels, and to arrange said first station to be operated on said one channel in response to said predetermined group signal; and
   b. second means for alternatively placing said station in a call originate mode and for causing said first receiver to scan the radio frequency channels, to stop said scanning caused by said second means on one of said channels and listening for a predetermined busy signal on said one channel and in response to the absence of said predetermined busy signal on said one channel, determining that said one channel is non-busy and arranging for said first station and said repeater to operate on said one channel in response to said absence of said busy signal thereon and in response to the presence of said predetermined busy signal, continuing said scanning.

6. The arrangement of claim 5 wherein said second means further causes said operated first station to transmit said busy signal for operating said repeater on said one channel.

7. The arrangement of claim 6 wherein said second means further causes said operated first station to transmit said predetermined group signal to said operated repeater and wherein said operated repeater retransmits and predetermined group signal to said second station.

8. An arrangement for establishing communication between a first radio station and a second radio station over one of a plurality of radio channels comprising:
   a. means for selectively placing said first station in an idle mode or in a call originate mode;
   b. a search generator responsive to said selective placing means being in said idle mode for causing said first radio station to be sequentially tuned through said plurality of radio channels and stopping said sequential tuning on a channel having at least one predetermined group signal thereon, and responsive to said selective placing means being in said call originate mode for causing said first radio station to be sequentially tuned through said plurality of radio channels and stopping said sequential tuning on a channel having no predetermined busy signal thereon; and
   c. a sequence generator responsive to said selective placing means being in said call originate mode for causing said first radio station to transmit said busy signal on said channel having no busy signal thereon, for thereafter causing said first radio station to be receptive to signals on said channel, and for thereafter indicating that communication is established in response to a predetermined signal received on said channel after the transmission of said busy signal by said station.

9. The arrangement of claim 8 wherein said sequence generator comprises means for causing said first station to transmit an initial group signal as well as said busy signal and wherein said received predetermined signal indicative of established communication comprises a continuous busy signal.

10. The arrangement of claim 9 and further comprising a repeater including a transmitter and receiver for operation on each of said radio channels.

11. The arrangement of claim 10 wherein said received predetermined signal indicative of established communication comprises a continuous busy signal transmitted by said repeater.

12. An arrangement for use with a first radio station to establish communication over a radio channel selected from a plurality of radio channels through a repeater to a second radio station, said arrangement comprising:
   a. a search generator for causing said first radio station to become tuned to each of said channels in a repetitive sequence;
   b. a sequence generator for providing the sequence of first causing said search generator to tune said first radio station to receive on each of said channels in sequence and locate an idle channel defined by the absence of a predetermined busy signal thereon, second causing said first radio station to transmit a busy signal on said idle channel, third causing said first radio station to transmit a group signal on said idle channel, said fourth stopping said transmission and causing said first station to listen for a busy signal on said idle channel; and
   c. means, coupled to said search generator, for selectively causing said first radio station to become enabled for communication on a channel having a predetermined signal thereon, or for selectively causing said sequence generator to enable said first radio station for communication on said idle channel in response to reception of a busy signal on said idle channel during the listening in said sequence generator sequence.

13. The arrangement of claim 12 wherein said sequence generator sequence is repeated in response to the absence of a busy signal on said idle channel when said first radio station listens on said idle channel.

14. A method for establishing radio communication from a first radio station through a radio repeater to a second radio station over a radio channel selected from a plurality of such channels comprising the steps of:
   a. placing said first radio station in a call originate mode and scanning said plurality of channels until an idle channel without any busy signal thereon is located, and enabling said first station on said idle channel;
   b. transmitting by said first radio station a busy signal to said radio repeater to enable said radio repeater on said idle channel;
   c. transmitting by said first radio station at least one predetermined group signal to said radio repeater on said idle channel for retransmission by said radio repeater to enable said second station;
   d. listening for a repeater transmitted busy signal on said idle channel at said first radio station to determine whether said radio repeater is transmitting on said idle channel;
   e. placing said second radio station in an idle mode and scanning said plurality of channels by said second radio station until said predetermined group signal is located and enabling said second station on said channel having said predetermined group signal; and
   f. communicating by said first radio station with said second radio station through said radio repeater in response to said repeater transmitted busy signal on said idle channel.

15. The method of claim 14 and, in response to the failure of said radio repeater to transmit said busy signal on said idle channel, comprising the further steps of:
   g. again transmitting by said first station said busy signal to said radio repeater to enable said radio repeater on said idle channel
   h. again transmitting by said first station said group signal to said radio repeater on said idle channel for retransmission by said radio repeater to enable said second station;
   i. receiving by said first radio station on said idle channel to determine whether said radio repeater is transmitting said repeater transmitted busy signal on said idle channel; and
   j. communicating by said first radio station with said second radio station through said radio repeater in response to said radio repeater transmitting said busy signal, or resuming scanning said channels in response to a failure of said first station to detect said repeater transmitted busy signal on said idle channel.

16. A method for establishing radio communication from a first radio station through a radio repeater to a second radio station over a radio channel selected from a plurality of such channels comprising the steps of:
   a. scanning by said first radio station said plurality of channels until an idle channel without any busy signal thereon is located, and enabling said first station on said idle channel;
   b. transmitting by said first radio station a busy signal to said radio repeater to enable said radio repeater on said idle channel;
   c. transmitting by said first radio station at least one group signal to said radio repeater on said idle channel;
   d. receiving by said first radio station on said idle channel to determine whether said radio repeater is transmitting a busy signal on said idle channel, and
   e. communicating by said first radio station with said second radio station through said radio repeater in response to said repeater transmitted busy signal on said idle channel.

17. An improved trunking system for a plurality of mobile radio stations, each having a transmitter and receiver capable of operating on associated frequencies of a plurality of channels, and a radio repeater having a transmitter and receiver for the associated frequencies of each of said plurality of channels, said trunking system comprising at each of said mobile radio stations:
   a. first means for selectively placing said mobile radio station in an idle mode or a call originate mode;
   b. a search generator coupled to said first means and to the radio transmitter and receiver of said mobile station for sequentially tuning said radio transmitter and receiver to each of said channels in response to said idle mode or in response to said call originate mode;
   c. a decoder connected to said radio receiver for producing first decode signals in response to said radio receiver detecting a predetermined signal and at least one predetermined group signal generated by another radio station on a channel to which said receiver had been tuned by said search generator;
   d. second means coupling said decoder to said search generator for supporting said search generator in response to said first decode signals so that said radio transmitter and receiver are tuned to the corresponding channel having said busy signal and said at least one predetermined group signal;
   e. third means coupled to said radio receiver and to said first means for producing an idle signal in response to the absence of a signal on a channel and in response to said call originate mode;
   f. fourth means connecting said third means to said search generator for stopping said search generator in response to said idle signal so that said radio transmitter and receiver are tuned to the idle channel;
   g. a sequence generator connected to said third means for producing an establishing a sequence of a busy period, a group period, and a first check period in response to said idle signal;
   h. an encoder connected to said radio transmitter for causing said radio transmitter to transmit selected signals;
   i. fifth means connecting said encoder to said sequence generator for producing a busy signal and a group signal in response to said busy period and said group period respectively;
   j. sixth means connecting said sequence generator to said decoder in response to said check period;
   i. and seventh means connected to said sequence generator, said decoder, and said radio transmitter and receiver for enabling said radio transmitter and receiver in response to a second decode signal produced by said decoder during said check period.

18. The improved trunking system of claim 17 wherein said second decode signal is produced by said decoder in response to said busy signal being received by said receiver during said first check period.

19. The improved trunking system of claim 17 or 18 wherein said seventh means causes said sequence generator to produce a second check period in response to the absence of said second decode signal during the first check period.

20. The improved trunking system of claim 19 wherein said radio transmitter and receiver are enabled in response to a second decode signal produced during the second check period, and wherein said search generator is sequentially advanced in response to the absence of a second decode signal during said second check period.

21. The improved trunking system of claim 17 and further including timing means connected to said first means for placing said mobile radio station in said idle mode after a predetermined time following said first means placing said mobile radio station in said call originate mode.

22. The improved trunking system of claim 18 and further including timing means connected to said first means for placing said mobile radio station in said idle mode after a predetermined time following said first means placing said mobile radio station in said call originate mode.

23. The improved trunking system of claim 19 and further including timing means connected to said first means for placing said mobile radio station in said idle mode after a predetermined time following said first means placing said mobile radio station in said call originate mode.

24. The improved trunking system of claim 20 and further including timing means connected to said first means for placing said mobile radio station in said idle mode after a predetermined time following said first means placing said mobile radio station in said call originate mode.

25. An improved trunking system for a plurality of mobile radio stations, each having a transmitter and receiver capable of operating on associated frequencies of a plurality of channels, and a radio repeater having a transmitter and receiver for the associated frequencies of each of said plurality of channels, said trunking system comprising at each of said mobile radio stations:
   a. first means for selectively placing said mobile radio station in a receive mode or a transmit mode;
   b. a search generator connected to said first means and to the radio transmitter and receiver of said mobile station for sequentially tuning said radio transmitter and receiver to each of said channels in response to said receive mode or in response to said transmit mode;
   c. a decoder connected to said radio receiver for producing a first decode signal in response to said radio receiver receiving a busy signal and at least one predetermined group signal on a given channel, and a second decode signal in response to said radio receiver receiving a busy signal on said given channel;

d. second means connecting said decoder to said search generator for stopping said search generator tuning on said given channel in response to said first decode signal;

e. third means connected to said radio receiver and to said first means for producing an idle signal in response to the absence of a signal on a channel and in response to said transmit mode;

f. fourth means connecting said third means to said search generator for stopping said search generator tuning on said idle channel in response to said idle signal;

g. a sequence generator connected to said third means for producing an establishing sequence of busy, group, and check periods in response to said idle signal;

h. an encoder connected to said radio transmitter for causing said radio transmitter to transmit selected tones;

i. fifth means connecting said encoder to said sequence generator for producing a busy signal and a group signal in response to said busy period and said group period respectively;

j. sixth means connecting said sequence generator to said decoder in response to said check period;

k. and seventh means connected to said sequence generator, said decoder, and said radio transmitter and receiver for enabling said radio transmitter and receiver in response to said second decode signal being produced by said decoder during said check period;

and said trunking system comprising at said radio repeater:

l. means connecting the output of said receiver to the input of said transmitter for repeating;

m. and timing means connected to said receiver output and to said transmitter for maintaining said transmitter operative only during reception of said busy signal and for a predetermined time thereafter, and thereafter turning said transmitter off.

26. The improved trunking system of claim 25 and further comprising a busy tone generator connected to said repeater transmitter.

27. A radio communication transceiver capable of automatically establishing radio communication with another similar transceiver over an idle one of a plurality of selectable radio frequency channels, said transceiver comprising:

a radio receiver for receiving radio signals from an external source including both control and communication signals, a radio transmitter for transmitting radio signals including both control and communication signals, at least one control signal encoder and decoder connected to selectively detect predetermined received control signals and to selectively cause transmission of predetermined transmitted control signals, a channel search generator connected to selectively cause said receiver and transmitter to operate on different ones of said radio frequency channels, and control circuitry connected to control said encoder, decoder and channel search generator to operate (a) in an idle mode to automatically scan at least the receiver over each of said channels, stopping to permit transceive operations over a particular channel if said predetermined received control signals are detected on that same channel, or, alternatively (b) in a call originate mode to automatically locate an idle one of said channels by scanning, if necessary, said receiver, stopping on a channel, listening for a busy signal and to thereafter in the absence of a busy signal on said channel generate and transmit a busy signal on said channel and then generate and transmit control signals over that same channel and to permit transceive communication operations to thereafter occur on such channel.

28. A radio communication transceiver as in claim 27 wherein said channel search generator includes means to effect operation at a higher rate at least while searching for an idle channel than after finding one in the call originate mode.

29. A radio communication transceiver as in claim 27 wherein said control circuitry includes means which causes it to automatically revert to the idle mode if communication signals are not transmitted by said transmitter within a predetermined time after locating an idle channel in the call originate mode.

30. A radio communication transceiver as in claim 27, 28 or 29 wherein said control circuitry includes means which causes it to automatically revert to the idle mode if an idle channel is not located within a predetermined time after initiation of the call originate mode.

31. A radio communication system comprising plural transceivers as in claim 27 and further including a radio repeater disposed within each of said communication channels.

32. A radio communication system as in claim 31 wherein each said repeater includes:

a radio repeater receiver for receiving radio signals including both control and communication signals, a detector connected to said repeater receiver for detecting at least some of said predetermined transmitted control signals after reception by said repeater receiver, a radio repeater transmitter connected for retransmitting radio signals, including both control and communication signals, received by said repeater receiver except for said at least some control signals, and a timer connected to said detector for automatically unkeying said radio repeater transmitter whenever said at least some control signals are not detected for a predetermined time period.

33. A radio communication system as in claim 32 wherein each said repeater includes a control signal generator connected to locally generate and cause transmissions of said at least some control signals in response to reception and detection of said at least some control signals.

34. A plural channel, trunked, radio communication system comprising:

plural radio transceivers, plural radio repeaters, one for each of said channels, for establishing communication channels between said transceivers, and control means in each transceiver for causing each transceiver to operate in one of two modes;

(a) an idle mode wherein each of said plural channels is automatically scanned to detect the presence of predetermined control signals thereon transmitted by one of said repeaters and, if detected, to at least temporarily stop such scanning and to permit transceive communication operations over the same channel on which such control signals were detected, or (b) a call originate mode wherein an idle channel is automatically detected, if available, and such detected idle channel is thereafter at least temporarily locked onto and used to permit transceive communication operations over that same channel by generating and transmitting a busy signal and predetermined control signals thereover and then listening for a busy signal on that same channel and establishing communication if a busy signal is received.

35. A plural channel, trunked, radio communication system as in claim 34 wherein said control means includes means which causes it to automatically revert to the idle mode if communication signals are not transmitted by said transmitter within a predetermined time after locating an idle channel in the call originate mode.

36. A plural channel, trunked, radio communication system as in claim 34 or 35 wherein said control means includes means which causes it to automatically revert to the idle mode if an idle channel is not located within a predetermined time after initiation of the cell originate mode.

37. A plural channel, trunked, radio communication system as in claim 34 or 35 wherein:

said control means includes means for causing a burst transmission of a control signal on said detected idle channel;

each of said repeaters includes means for causing a continuous transmission of a control signal on its channel in response to receipt and detection of said control signal from a transceiver; and said control means includes means for permitting normal transceive operations on said detected idle channel in response to receipt and detection of said control signal from the respective repeater.

38. A radio communication transceiver capable of automatically establishing operation with another similar transceiver on an idle one of plural communication channels, said transceiver comprising:

a radio receiver means, a radio transmitter means, and control means for causing operation in one of two modes:

(a) an idle mode wherein each of said plural channels is automatically scanned to detect the presence of predetermined control signals transmitted by another of said transceivers and, if detected, to at least temporarily stop such scanning and to permit transceive communication operations over the same channel on which such control signals were detected, and (b) a call originate mode wherein an idle channel is automatically detected, if available, and such detected idle channel is thereafter at least temporarily locked onto and used to permit transceive communication operations over that same channel by generating and transmitting a busy signal and predetermined control signals thereover and then listening for a busy signal on that same channel and establishing communication if a busy signal is received.

39. A radio communication transceiver as in claim 38 wherein said control circuitry includes means which causes it to automatically revert to the idle mode if communication signals are not transmitted by said transmitter within a predetermined time after locating an idle channel in the call originate mode.

40. A radio communication transceiver as in claim 38 or 39 wherein said control circuitry includes means which causes it to automatically revert to the idle mode if an idle channel is not located within a predetermined time after initiation of the call originate mode.

41. A radio communication transceiver as in claim 38 further comprising:

means for automatically resuming operation in said idle mode if calling signals are not responded to by an operator within a predetermined time interval after their detected occurrence.

42. A radio communication transceiver as in claim 38 or 41 further comprising:

means for resetting said control means for operation in said idle mode upon operator actuation during said transceive communication operations.

43. A method of automatically establishing trunked plural channel radio communication, between plural transceivers, said method comprising the following steps at each transceiver site:

normally scanning each channel to detect the presence of predetermined control signals thereon transmitted by another of said plural transceivers and, if detected, at least temporarily interrupting the scan and permitting transceive operations to occur, and upon command, interrupting said normal scanning step to search for an idle one of said channels, and, when detected, thereafter generating and transmitting predetermined control signals thereon including the transmission of a busy signal interrupted during an initial listening period when an answering busy signal is detected to permit transceive communication operations.

44. An arrangement for automatically establishing radio communication between plural transceivers on one of plural channels via a repeater, said arrangement comprising:

means for causing at least one of said transceivers to normally scan each channel to detect the presence of predetermined control signals transmitted by said repeater and, if detected, at least temporarily interrupting the scan and permitting transceive operations to occur solely on said last named channel via said repeater with at least one other of said transceivers, said transceive operations comprising transmission of a busy signal by one of said transceivers and receiving a corresponding busy signal transmitted by said repeater to enable the repeater to repeat message signals between said one and said one other transceiver.

45. An arrangement for automatically establishing radio communication between plural transceivers on one of plural channels via a repeater, said arrangement comprising:

means to cause at least one of said transceivers to search for an idle one of said channels by determining an absence of predetermined control signals and, when control signals transmitted by another of said plural transceivers are detected, thereafter exchanging busy signals by transmitting a busy signal to said repeater and detecting a corresponding busy signal transmitted responsively by said repeater on said last named channel with said repeater to permit transceive communication operations to occur via said repeater solely on said last named channel with at least one other of said transceivers.

46. An arrangement according to claim 45 wherein said transceive operations comprise said one transceiver being responsive to said repeater transmitted control signals to transmit control signals and message signals for repeating by said repeater.

47. An arrangement for automatically establishing radio communication between plural transceivers on one of plural channels via a repeater, said arrangement comprising:
  means for causing at least one of said transceivers to normally scan each channel to detect the presence of predetermined control signals transmitted by another of said transceivers and repeated by said repeater on one of said channels and, if detected, at least temporarily interrupting the scan and permitting transceive operations to occur solely on said one channel with at least one other of said transceivers, and
  command means located at said at least one of said transceivers comprising means for interrupting said normal scanning by said at least one of said transceivers to cause said last named transceiver to search for an idle one of said channels having no such control signals thereon and, when such signals are detected, thereafter generating and transmitting a busy signal and detecting a corresponding busy signal transmitted by said repeater thereover to permit transceive communication operations to occur via said repeater solely on said last named channel with at least one other of said transceivers.

48. A repeater arrangement for automatically establishing radio communication between plural transceivers capable of transmitting control signals on one of plural channels via a repeater, said arrangement comprising:
  repeater means in said repeater for detecting the presence of transceiver originated first control signals received from a transceiver and in response enabling said repeater to transmit repeater originated control signals enabling said last named transceiver to thereafter transmit message signals together with second control signals, said repeater means being responsive to said first control signals for repeating said second control signals on one of said channels to another transceiver, said repeater means comprising further means responsive to further address control signals received from one of said transceivers on said one channel to repeat message signals therebetween on said channel, said repeater means transmitting said repeated second control signals continuously on said channel during repeating of message signals and for a predetermined time thereafter to indicate that said channel is being used for repeating.

* * * * *

UNITED STATES PATENT AND TRADEMARK OFFICE
CERTIFICATE OF CORRECTION

PATENT NO. : 4,409,687

DATED : October 11, 1983

INVENTOR(S) : John C. Berti et al

It is certified that error appears in the above-identified patent and that said Letters Patent is hereby corrected as shown below:

Col. 6, line 10, cancel "type" and insert -- types --

Col. 6, line 30, cancel "$\overline{Q}$" (first occurrence) and insert -- Q --

Col. 6, line 30, cancel "Q" (second occurrence of Q) and insert -- $\overline{Q}$ --

Col. 6, line 32, cancel "$\overline{Q}$" and insert -- Q --

Col. 11, line 17, cancel "Q" and insert -- $\overline{Q}$ --

Col. 18, line 3, cancel "said" and insert -- and --

Col. 19, line 46, cancel "supporting" and insert -- stopping --

Col. 23, line 29, cancel "cell" and insert -- call --

Signed and Sealed this

Twenty-second Day of May 1984

[SEAL]

Attest:

GERALD J. MOSSINGHOFF

Attesting Officer    Commissioner of Patents and Trademarks